United States Patent
Hiramoto et al.

(10) Patent No.: US 9,036,004 B2
(45) Date of Patent: *May 19, 2015

(54) THREE-DIMENSIONAL IMAGE CAPTURE DEVICE

(75) Inventors: Masao Hiramoto, Osaka (JP);
Masayuki Misaki, Hyogo (JP);
Teruyuki Takizawa, Osaka (JP);
Masaaki Suzuki, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 475 days.

This patent is subject to a terminal disclaimer.

(21) Appl. No.: 13/255,393

(22) PCT Filed: Dec. 22, 2010

(86) PCT No.: PCT/JP2010/007436
§ 371 (c)(1),
(2), (4) Date: Sep. 8, 2011

(87) PCT Pub. No.: WO2011/083543
PCT Pub. Date: Jul. 14, 2011

(65) Prior Publication Data
US 2012/0002018 A1    Jan. 5, 2012

(30) Foreign Application Priority Data

Jan. 5, 2010 (JP) .................. 2010-000377
Jan. 14, 2010 (JP) .................. 2010-005467

(51) Int. Cl.
G06K 9/00 (2006.01)
G02F 1/1335 (2006.01)
H04N 5/335 (2011.01)
H04N 13/02 (2006.01)
G03B 35/08 (2006.01)
G03B 35/10 (2006.01)

(52) U.S. Cl.
CPC ............... *H04N 13/021* (2013.01); *G06K 9/00* (2013.01); *G03B 35/08* (2013.01); *G03B 35/10* (2013.01); *H04N 13/0214* (2013.01)

(58) Field of Classification Search
CPC ......... G02B 27/28; H04N 5/335; G02F 1/335
USPC ........ 348/42–46, 49, 342, 280; 359/371, 376, 359/462; 386/210, 223, 224; 352/57; 396/324; 382/154, 103
See application file for complete search history.

(56) References Cited

U.S. PATENT DOCUMENTS

| | | | |
|---|---|---|---|
| 4,239,338 A * | 12/1980 | Borrelli et al. | 430/508 |
| 4,709,212 A | 11/1987 | MacFall et al. | |
| 5,557,324 A * | 9/1996 | Wolff | 345/207 |
| 5,649,897 A | 7/1997 | Nakamura et al. | |
| 6,807,295 B1 * | 10/2004 | Ono | 382/154 |
| 8,120,861 B2 * | 2/2012 | Moskovits et al. | 359/819 |
| 2004/0201888 A1 | 10/2004 | Hagita | |
| 2006/0082879 A1 | 4/2006 | Miyoshi et al. | |
| 2010/0253820 A1 * | 10/2010 | Kanamori et al. | 348/280 |
| 2010/0289878 A1 | 11/2010 | Sato et al. | |
| 2010/0321476 A1 * | 12/2010 | Martinez et al. | 348/49 |
| 2012/0075432 A1 * | 3/2012 | Bilbrey et al. | 348/48 |
| 2014/0055661 A1 * | 2/2014 | Imamura et al. | 348/342 |

FOREIGN PATENT DOCUMENTS

| | | |
|---|---|---|
| CN | 1571519 A | 1/2005 |
| CN | 1798958 A | 7/2006 |
| JP | 62-217790 A | 9/1987 |
| JP | 62-291292 A | 12/1987 |
| JP | 2001-016611 A | 1/2001 |
| JP | 2002-148732 A | 5/2002 |

OTHER PUBLICATIONS

Atarius, Roozbeh, Signal-to-Noise ratio Enhancement of Cardiac Late Potentials using Ensemble Correlation, Feb. 20, 1995, IEEE Trans., p. 2.*
Usmani, Riaz, Applied Linear Algebra, 1987, Marcel Dekker Inc, Ed. 1, p. 9.*
Wikipedia, Matrix (mathematics), Mar. 6, 2009.*
International Search Report for corresponding International Application No. PCT/JP2010/007436 mailed Feb. 8, 2011.
International Search Report for related International Application No. PCT/JP2010/007435 mailed Feb. 8, 2011.

Co-pending U.S. Appl. No. 13/255,386, filed Sep. 8, 2011 in the name of M. Hiramoto et al. and entitled "Three-Dimensional Image Capture Device".
Chinese Search Report with English Translation for corresponding Chinese patent application No. 201080009869.2 dated Mar. 5, 2014.
Chinese Search Report for corresponding Chinese App. No. 201080009911.0 dated Mar. 24, 2014, with English translation.
Office Action for related U.S. Appl. No. 13/255,386, mailed on Aug. 15, 2014.
Office Action mailed on Sep. 25, 2013 for related U.S. Appl. No. 13/255,386, filed Sep. 8, 2011.

* cited by examiner

*Primary Examiner* — Jorge L Ortiz Criado
*Assistant Examiner* — Albert Kir
(74) *Attorney, Agent, or Firm* — Renner, Otto, Boisselle & Sklar, LLP (57) ABSTRACT

A 3D image capture device includes: a light transmitting member 2 with polarizing areas and a non-polarizing area; a solid-state image sensor 1 for receiving the light transmitted through the member 2; an imaging section 3 for producing an image on the imaging area 1*a* of the sensor 1; and an image generating section. The member 2 has n polarizing areas P(1), P(2), ... and P(n) (where n is an integer and n≥2), each of which transmits only a light ray polarized in a particular direction, and a non-polarizing area P(n+1) that transmits any light ray irrespective of its polarization direction. Those n polarizing areas have mutually different transmission axis directions. The sensor 1 includes a pixel array, divided into pixel blocks each consisting of (n+1) pixels, and a filter array including n polarization filters arranged so as to face n out of the (n+1) pixels and having different transmission axis directions. The image generating section generates images based on the light rays that have entered the n polarizing areas and the non-polarizing area using pixel signals supplied from those pixels.

11 Claims, 5 Drawing Sheets

THREE-DIMENSIONAL IMAGE CAPTURE DEVICE

TECHNICAL FIELD

The present invention relates to a single-lens 3D image capturing technology for capturing multiple images with parallax by using one optical system and one image sensor.

BACKGROUND ART

Recently, the performance and functionality of digital cameras and digital movie cameras that use some solid-state image sensor such as a CCD and a CMOS (which will be sometimes simply referred to herein as an "image sensor") have been enhanced to an astonishing degree. In particular, the size of a pixel structure for use in an image sensor has been further reduced these days thanks to rapid development of semiconductor device processing technologies, thus getting an even greater number of pixels and drivers integrated together in an image sensor. As a result, the resolution of an image sensor has lately increased rapidly from one million pixels to ten million or more pixels in a matter of few years. On top of that, the quality of an image captured has also been improved significantly as well. As for display devices, on the other hand, LCD and plasma displays with a reduced depth now provide high-resolution and high-contrast images, thus realizing high performance without taking up too much space. And such video quality improvement trends are now spreading from 2D images to 3D images. In fact, 3D display devices that achieve high image quality although they require the viewer to wear a pair of polarization glasses have been developed just recently and put on the market one after another.

As for the 3D image capturing technology, a typical 3D image capture device with a simple arrangement uses an image capturing system with two cameras to capture a right-eye image and a left-eye image. According to the so-called "two-lens image capturing" technique, however, two cameras need to be used, thus increasing not only the overall size of the image capture device but also the manufacturing cost as well. To overcome such a problem, methods for capturing multiple images with parallax by using a single camera have been researched and developed. For example, Patent Document No. 1 discloses a scheme that uses two polarizers, of which the transmission axes cross each other at right angles, and a rotating polarization filter.

Figure 8:
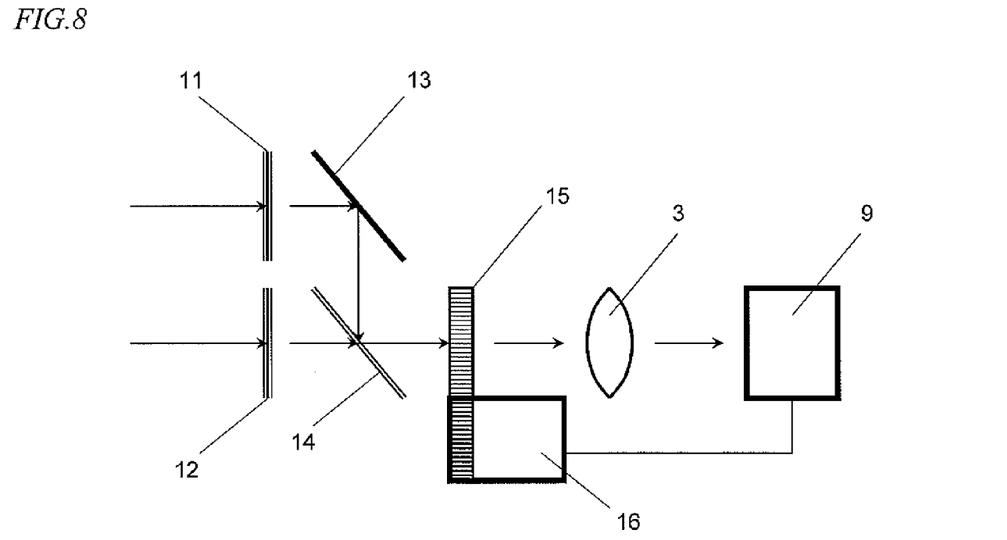
FIG. 8 illustrates the arrangement of an image capturing system disclosed in Patent Document No. 1.

FIG. 8 is a schematic representation illustrating an arrangement for an image capturing system that adopts such a scheme. This image capturing system includes a 0-degree-polarization polarizer 11, a 90-degree-polarization polarizer 12, a reflective mirror 13, a half mirror 14, a circular polarization filter 15, a driver 16 that rotates the circular polarization filter 15, an optical lens 3, and an image capture device 9 for capturing the image that has been produced by the optical lens. In this arrangement, the half mirror 14 reflects the light that has been transmitted through the polarizer 11 and then reflected from the reflective mirror 13 but transmits the light that has been transmitted through the polarizer 12. With such an arrangement, the light rays that have been transmitted through the two polarizers 11 and 12, which are arranged at two different positions, pass through the half mirror 14, the circular polarization filter 15 and the optical lens 3 and then enter the image capture device 9, where an image is captured. The image capturing principle of this scheme is that two images with parallax are captured by rotating the circular polarization filter 15 so that the light rays that have entered the two polarizers 11 and 12 are imaged at mutually different times.

According to such a scheme, however, images at mutually different positions are captured time-sequentially by rotating the circular polarization filter 15, and therefore, those images with parallax cannot be captured at the same time, which is a problem. In addition, the durability of such a system is also a question mark because the system uses mechanical driving. On top of that, since all of the incoming light is received by the polarizers and the polarization filter, the quantity of the light received eventually by the image capture device 9 decreases by as much as 50%, which is non-negligible, either.

To overcome these problems, Patent Document No. 2 discloses a scheme for capturing two images with parallax without using such mechanical driving. An image capture device that adopts such a scheme gets the two incoming light rays, which have come from two different directions, condensed by a reflective mirror, and then received by an image capture device in which two different kinds of polarization filters are arranged alternately, thereby capturing two images with parallax without using a mechanical driving section.

Figure 9:
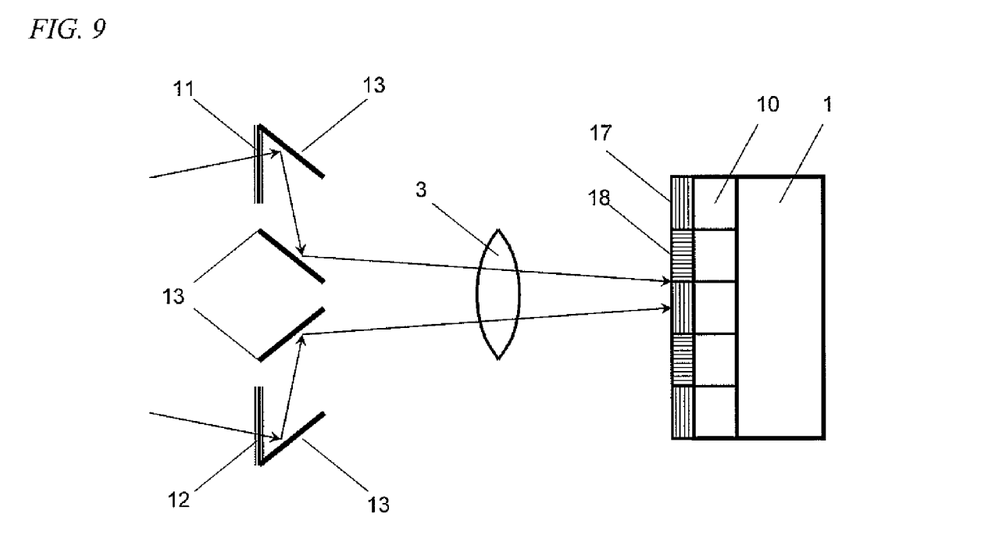
FIG. 9 illustrates the arrangement of an image capturing system disclosed in Patent Document No. 2.

FIG. 9 is a schematic representation illustrating an arrangement for an image capturing system that adopts such a scheme. This image capturing system includes two polarizers 11 and 12, of which the transmission axes are arranged to cross each other at right angles, reflective mirrors 13, an optical lens 3, and an image capture device 1. On its imaging area, the image capture device 1 has a number of pixels 10 and polarization filters 17 and 18, each of which is provided one to one for an associated one of the pixels 10. Those polarization filters 17 and 18 are arranged alternately over all of those pixels. In this case, the transmission axis directions of the polarization filters 17 and 18 agree with those of the polarizers 11 and 12, respectively.

With such an arrangement, the incoming light rays are transmitted through the polarizers 11 and 12, reflected from the reflective mirrors 13, passed through the optical lens 3 and then incident on the imaging area of the image capture device 1. Those light rays to be transmitted through the polarizers 11 and 12, respectively, and then incident on the image capture device 1 are transmitted through the polarization filters 17 and 18 and then photoelectrically converted by the pixels that face those polarization filters 17 and 18. If the images to be generated based on those light rays that have been transmitted through the polarizers 11 and 12 and then incident on the image capture device 1 are called a "right-eye image" and a "left-eye image", respectively, then the right-eye image and the left-eye images are generated by a group of pixels that face the polarization filters 17 and a group of pixels that face the polarization filter 18.

As can be seen, according to the scheme disclosed in Patent Document No. 2, two kinds of polarization filters, of which the transmission axes are arranged so as to cross each other at right angles, are arranged alternately over the pixels of the image capture device, instead of using the circular polarization filter disclosed in Patent Document No. 1. As a result, although the resolution decreases to a half compared to the method of Patent Document No. 1, a right-eye image and a left-eye image with parallax can be obtained at the same time by using a single image capture device.

According to such a technique, however, the incoming light has its quantity decreased considerably when being transmitted through the polarizers and the polarization filters, and therefore, the quantity of the light received by the image capture device decreases as significantly as in Patent Document No. 1.

Figure 10:
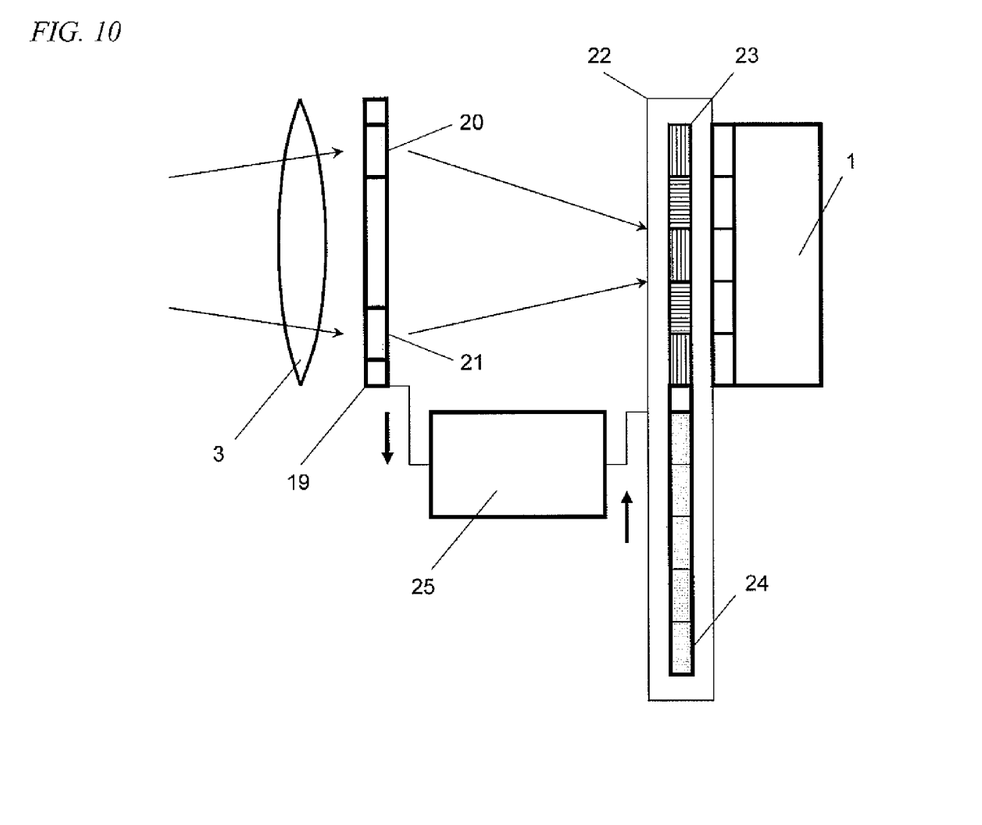
FIG. 10 illustrates the arrangement of an image capturing system disclosed in Patent Document No. 3.

As another approach to the problem that the image capture device comes to receive a decreased quantity of light, Patent Document No. 3 discloses a technique for mechanically changing the modes of operation from the mode of capturing multiple images that have parallax into the mode of capturing a normal image, and vice versa. FIG. 10 schematically illustrates an arrangement for an image capturing system that uses such a technique. The image capture device shown in FIG. 10 includes a light transmitting member 19 that has two polarized light transmitting portions 20 and 21 and that transmits the light that has come from an optical lens 3 only through those transmitting portions, a light receiving member optical filter tray 22 in which particular component transmitting filters 23 that split the light that has come from the polarized light transmitting portions 20 and 21 and color filters 24 are arranged as a set, and a filter driving section 25 that removes the light transmitting member 19 and the particular component transmitting filters 23 from the optical path and inserts the color filters 24 onto the optical path instead, and vice versa.

According to this technique, by running the filter driving section 25, the light transmitting member 19 and the particular component transmitting filters 23 are used to capture two images with parallax, while the color filters 24 are used to capture a normal image. However, the two images with parallax are shot in basically the same way as in Patent Document No. 2, and therefore, the incoming light can be used much less efficiently than in a normal image capturing session. When a normal color image is shot, on the other hand, the light transmitting member 19 is removed from the optical path and the color filters 24 are inserted instead of the particular component transmitting filters 23. As a result, a color image can be generated with the incoming light used highly efficiently.

CITATION LIST

Patent Literature

Patent Document No. 1: Japanese Patent Application Laid-Open Publication No. 62-291292
Patent Document No. 2: Japanese Patent Application Laid-Open Publication No. 62-217790
Patent Document No. 3: Japanese Patent Application Laid-Open Publication No. 2001-016611

SUMMARY OF INVENTION

Technical Problem

According to these conventional techniques, a single-lens camera can capture two images with parallax by using polarizers (or a polarized light transmitting member) and polarization filters. In this case, each of those polarizers and polarization filters is made up of two different kinds of polarization elements, of which the transmission axes are defined by 0 and 90 degrees, respectively. That is why although two images with parallax can be certainly captured with a single lens camera, the incoming light cannot be used so efficiently and the image capturing sensitivity is lower than usual. On top of that, to obtain a color image without causing the sensitivity problem, the light receiving member should be provided with an optical filter tray or a filter driving section. Furthermore, even if the optical filter tray and the filter driving section are provided but if the subject's status when those images with parallax are captured changes when a color image is captured, then the parallax images and the color image are not captured in the same state. That is to say, these two kinds of images cannot be obtained at the same time, which is also a problem.

It is therefore an object of the present invention to provide an image capturing technique for capturing multiple images with parallax without providing any such mechanical driving section for its image capturing system. According to a preferred embodiment of the present invention, those images with parallax and an image that does not cause a sensitivity problem can be captured at the same time.

Solution to Problem

A 3D image capture device according to the present invention includes: a light transmitting member with n polarizing areas (where n is an integer that is equal to or greater than two), each of which transmits only a light ray that is polarized in a particular direction, and a non-polarizing area that transmits any light ray irrespective of its polarization direction, the n polarizing areas having mutually different transmission axis directions; a solid-state image sensor, which is arranged to receive the light ray that has been transmitted through the light transmitting member and which includes a pixel array and a filter array, the pixel array being divided into a number of pixel blocks, each of which is comprised of (n+1) pixels, the filter array including n polarization filters that are arranged so as to face n out of the (n+1) pixels and that have mutually different transmission axis directions; an imaging section for producing an image on the imaging area of the solid-state image sensor; and an image generating section for generating (n+1) images based on the light rays that have entered the n polarizing areas and on the non-polarizing area using (n+1) pixel signals supplied from the (n+1) pixels.

In one preferred embodiment, the image generating section generates the (n+1) images by performing computations using a matrix of (n+1) rows and (n+1) columns. The matrix is defined by the respective optical transmittances of the polarizing areas, the polarization filters and the non-polarizing area.

In this particular preferred embodiment, the image generating section forms the matrix by defining the transmittance of a light ray that has been transmitted through a $j^{th}$ polarizing area (where j is an integer that satisfies $1 \le j \le n$) and then an $i^{th}$ polarization filter (where i is an integer that satisfies $1 \le i \le n$) to be an element a (i, j) at a row i, column j position, the transmittance of a light ray that has been transmitted through the non-polarizing area and then the $i^{th}$ polarization filter to be an element a (i, n+1) at a row i, column (n+1) position, and the transmittance of a light ray that has been transmitted through any of the first through $n^{th}$ polarizing areas to be an element a (n+1, j) at a row (n+1), column j position, respectively. And the image generating section makes computations using the inverse matrix of the matrix and the (n+1) pixel signals, thereby generating the (n+1) images.

In another preferred embodiment, the respective transmission axis directions of the polarizing areas and the polarization filters are set so as to prevent the determinant of the matrix from going zero.

In still another preferred embodiment, the respective transmission axis directions of the polarizing areas and the polarization filters are set so as to maximize the absolute value of the determinant of the matrix.

In yet another preferred embodiment, n=2.

In this particular preferred embodiment, if one of the n polarizing areas is called a first polarizing area and the other a second polarizing area, the first and second polarizing areas are arranged on mutually opposite sides with respect to a line segment that passes the center of the light transmitting member and that evenly splits the light receiving area of the light transmitting member into two.

In a specific preferred embodiment, at least a part of the non-polarizing area is located between the first and second polarizing areas.

In yet another preferred embodiment, if n=2 and if one of the n polarization filters is called a first polarization filter and the other a second polarization filter, each pixel block is comprised of eight pixels, which include the n pixels and which are arranged in four rows and two columns. A first color filter for transmitting a light ray falling within a first wavelength range is arranged so as to face a pixel at a row 1, column 1 position and a pixel at a row 3, column 1 position. A second color filter for transmitting a light ray falling within a second wavelength range is arranged so as to face a pixel at row 2, column 1 position and a pixel at a row 4, column 1 position. Either a third color filter for transmitting a light ray falling within a third wavelength range or a transparent member is arranged so as to face a pixel at a row 1, column 2 position and a pixel at a row 3, column 2 position. The first polarization filter is arranged so as to face a pixel at a row 2, column 2 position. And the second polarization filter is arranged so as to face a pixel at a row 4, column 2 position.

In yet another preferred embodiment, n=2, and each pixel block is comprised of four pixels including the n pixels. If the four pixels are called first, second, third and fourth pixels, respectively, and if one of the n polarization filters is called a first polarization filter and the other a second polarization filter, a first color filter for transmitting a light ray falling within a first wavelength range is arranged so as to face the first pixel. A second color filter for transmitting a light ray falling within a second wavelength range is arranged so as to face the second pixel. The first polarization filter and a third color filter for transmitting a light ray falling within a third wavelength range are arranged so as to face the third pixel. The second polarization filter and the third color filter for transmitting the light ray falling within the third wavelength range are arranged so as to face the fourth pixel.

In yet another preferred embodiment, the image generating section adds an image signal generated based on a light ray that has entered the non-polarizing area to an image signal generated based on a light ray that has entered each said polarizing area, thereby increasing an SN ratio of an image that has been generated based on the light ray that has entered each said polarizing area.

Advantageous Effects of Invention

The 3D image capture device of the present invention includes a light transmitting member that has n polarizing areas and a non-polarizing area and an image sensor that has n groups of pixels with polarization filters and a group of pixels with no polarization filters. That is why an equation showing the relation between an image signal, which is generated based on the light ray that has entered any of (n+1) areas of the light transmitting member, and a signal that can be obtained by the image sensor is derived. And an image to be generated based on the light ray that has entered each area of the light transmitting member can be calculated by that equation. As a result, not only can multiple images with parallax be generated but also can an image free from a sensitivity problem be generated based on the light ray that has been transmitted through the non-polarizing area.

DESCRIPTION OF EMBODIMENTS

Hereinafter, preferred embodiments of the present invention will be described with reference to the accompanying drawings. In the following description, any element shown in multiple drawings and having substantially the same function will be identified by the same reference numeral. It should be noted that a signal or information representing an image will sometimes be referred to herein as just an "image". And multiple images with parallax will sometimes be referred to herein as "multi-viewpoint images".

Embodiment 1

Figure 1:
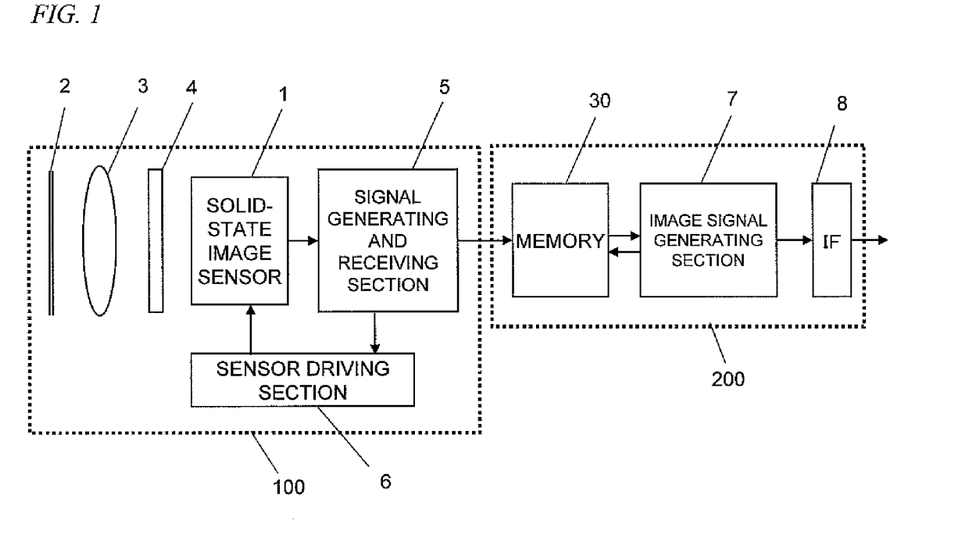
FIG. 1 illustrates an overall configuration for an image capture device as a preferred embodiment of the present invention.

First of all, a First Specific Preferred Embodiment of the present invention will be described. FIG. 1 is a block diagram illustrating an overall configuration for a 3D image capture device as a first preferred embodiment of the present invention. The image capture device of this preferred embodiment is a digital electronic camera and includes an image capturing section 100 and a signal processing section 200 that receives a signal from the image capturing section 100 and outputs a signal representing an image (i.e., an image signal).

The image capturing section 100 includes an image sensor 1 with a number of photosensitive cells (pixels) that are arranged on its imaging area, a light transmitting plate 2 with a polarizing area that transmits only the light polarized in a particular direction and a non-polarizing area that transmits any light irrespective of its polarization direction, an optical lens 3 for producing an image on the imaging area of the image sensor 1, and an infrared cut filter 4. The image capturing section 100 further includes a signal generating and receiving section 5, which not only generates a fundamental signal to drive the image sensor 1 but also receives the output signal of the image sensor 1 and sends it to the signal processing section 200, and a sensor driving section 6 for driving the image sensor 1 in accordance with the fundamental signal generated by the signal generating and receiving section 5. The image sensor 8 is typically a CCD or CMOS sensor, which may be fabricated by known semiconductor device processing technologies. The signal generating and receiving section 5 and the sensor driving section 30 may be implemented as an LSI such as a CCD driver.

The signal processing section 200 includes an image signal generating section 7 for generating an image signal by processing the signal supplied from the image capturing section 100, a memory 30 for storing various kinds of data that have been produced while the image signal is being generated, and an interface (I/F) section 8 for sending out the image signal thus generated to an external device. The image signal generating section 7 is preferably a combination of a hardware component such as a known digital signal processor (DSP) and a software program for use to perform image processing involving the image signal generation. The memory 30 may be a DRAM, for example. And the memory 30 not only stores the signal supplied from the image capturing section 100 but also temporarily retains the image data that has been generated by the image signal generating section 7 or compressed image data. These image data are then output to either a storage medium or a display section (neither is shown) by way of the interface section 8.

The image capture device of this preferred embodiment actually further includes an electronic shutter, a viewfinder, a power supply (or battery), a flashlight and other known components. However, the description thereof will be omitted herein because none of them are essential components that would make it difficult to understand how the present invention works unless they were described in detail.

Next, the configuration of the image capturing section 100 will be described in further detail with reference to FIGS. 2 through 4.

Figure 2:
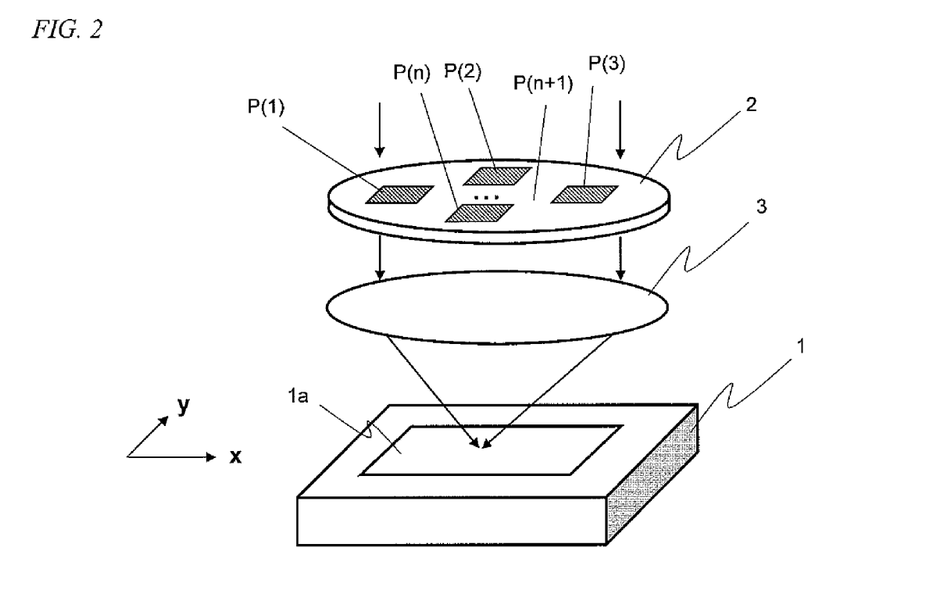
FIG. 2 schematically illustrates the relative arrangement of a light transmitting plate, a lens and an image sensor in a first preferred embodiment of the present invention.

FIG. 2 schematically illustrates the relative arrangement of the light transmitting plate 2, the optical lens 3 and the image sensor 1 in the image capturing section 100. It should be noted that illustration of the other elements is omitted in FIG. 2. The light transmitting plate 2 has n polarizing area P(1), P(2), . . . and P(n) (where n is an integer that is equal to or greater than two) and a non-polarizing area (transparent area) P(n+1) and transmits the incoming light. Although four polarizing areas are illustrated in FIG. 2, any other number n of polarizing areas may be provided as long as n is at least two. The optical lens 3 is a known lens and condenses the light that has been transmitted through the light transmitting plate 2, thereby imaging the light on the imaging area 1a of the image sensor 1. In the following description, the xy coordinates shown in FIG. 2 will be used.

Figure 3:
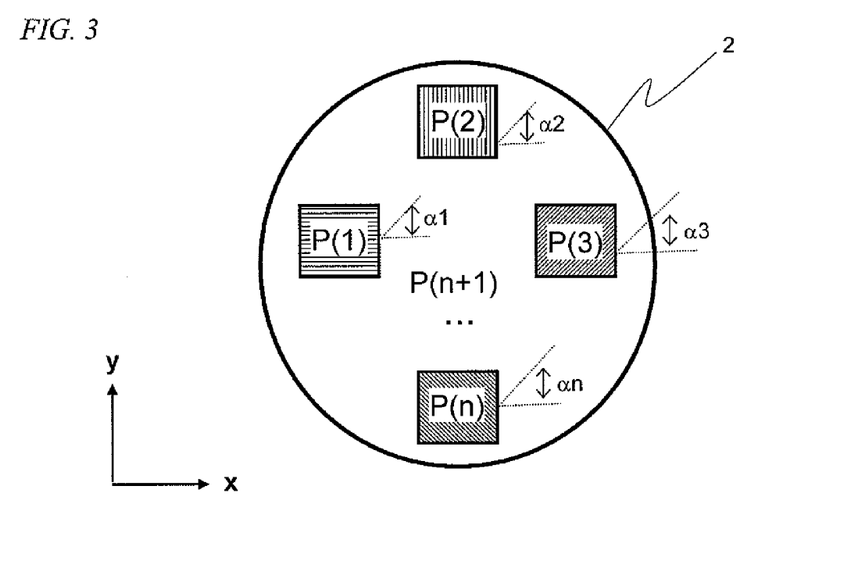
FIG. 3 is a front view of the light transmitting plate of the first preferred embodiment of the present invention.

FIG. 3 is a front view of the light transmitting plate 2 of this preferred embodiment. The light transmitting plate 2, as well as the optical lens 3, has a circular shape in this example but may also have any other shape. The light transmitting plate 2 has n polarizing areas P(1), P(2), . . . and P(n), which have respectively different transmission axis directions. The rest of the light transmitting plate 2, other than the polarizing areas, is a non-polarizing area P(n+1), which transmits any light irrespective of its polarization direction. In this preferred embodiment, supposing i=1, 2, . . . and n, the transmission axis of the $i^{th}$ polarizing area P(i) defines a tilt angle α with respect to the x direction (i.e., the horizontal direction). The polarizing areas P(1), P(2), . . . and P(n) may be made of a known polarizer, for example. On the other hand, the non-polarizing area P(n+1) may be any member as long as it can transmit the incoming light with high transmittance. In this preferred embodiment, the light transmitting plate 2 functions as the light transmitting member as defined in the claims. Optionally, part of the light transmitting plate 2 shown in FIG. 3 may be made of an opaque material.

On the imaging area 1a of the image sensor 1 shown in FIG. 2, there is an array of photosensitive cells (pixels) that are arranged two-dimensionally. Such an array of photosensitive cells will be referred to herein as a "pixel array". In addition, a filter array, including multiple polarization filters, is also arranged on the light incident side of the image sensor 1 so as to face the pixel array. Each of those pixels typically includes a photodiode and photoelectrically converts the incoming light into an electrical signal representing the intensity of that light received. Such an electrical signal will be referred to herein as either a "photoelectrically converted signal" or a "pixel signal". In this preferred embodiment, the pixel array is divided into a number of pixel blocks, each consisting of (n+1) pixels.

Figure 4:
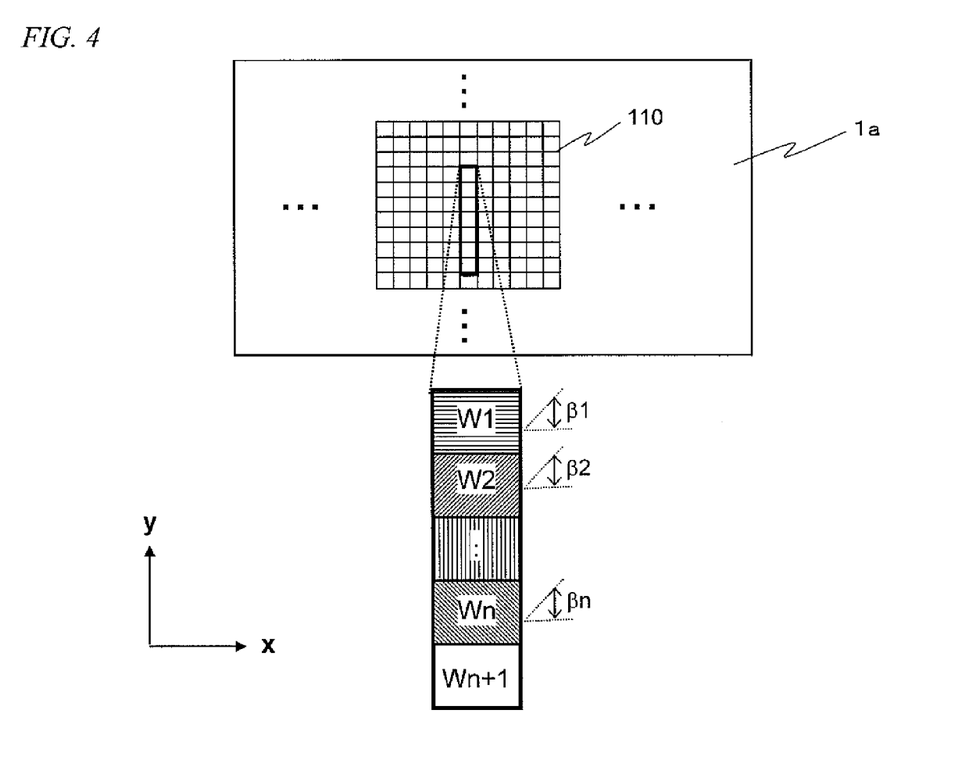
FIG. 4 illustrates a basic arrangement of pixels on the imaging area of a solid-state image sensor according to the first preferred embodiment of the present invention.

FIG. 4 schematically illustrates a part of the filter array 110 that is arranged on the imaging area 1a. The (n+1) pixels that form each pixel block are arranged in line in the y direction (i.e., the vertical direction). Meanwhile, n polarization filters are arranged so as to face n out of the (n+1) pixels (which are identified by W1, W2, . . . and Wn) so that each of the n polarization filters faces an associated one of the pixels one to one. Those n polarization filters that face the pixels W1, W2, . . . and Wn have respectively different transmission axis directions, which respectively define tilt angles β1, β2, . . . and βn with respect to the x direction. However, no polarization filters are arranged to face the pixel Wn+1 at the row (n+1), column 1 position.

With such an arrangement adopted, the light entering this image capture device during shooting passes through the light transmitting plate 2, the optical lens 3, the infrared cut filter 4 and the filter array 110 and then is incident on the pixel array. Each of those pixels receives the light ray that has been transmitted through an associated one of the polarizing areas P(1), P(2), . . . and P(n) of the light transmitting plate 2 and the light ray that has been transmitted through the non-polarizing area P(n+1) thereof and outputs a photoelectrically converted signal representing the intensity of the light received. The photoelectrically converted signals are output from those pixels to the signal processing section 200 by way of the signal generating and receiving section 5. The image signal generating section 7 of the signal processing section 200 generates multi-viewpoint images based on the signals supplied from the image capturing section 100.

Hereinafter, it will be described specifically what photoelectrically converted signals are output by respective pixels. First of all, the photoelectrically converted signal output by the pixel Wn+1, for which no polarization filters are provided, will be described. Specifically, the pixel Wn+1 receives the incoming light that has been transmitted through the light transmitting plate 2, the optical lens 3 and the infrared cut filter 4 and photoelectrically converts that light. In this case, when passing through any of the polarizing areas of the light transmitting plate 2, the incoming light has its intensity decreased. The transmittance of that polarizing area will be identified herein by T1. In the following description, the respective signal levels in a situation where the light rays that have entered the respective polarizing areas P(1), P(2), . . . and P(n) and the non-polarizing area P(n+1) are just photoelectrically converted by the image sensor 1 without having their intensities decreased are identified by adding a subscript s to their reference signs. That is to say, the levels of the signals representing the intensities of the light rays that have entered the areas P(1), P(2), . . . and P(n+1) will be identified herein by Ps(1), Ps(2), . . . and Ps(n+1), respectively. Also, if the transmittance of the non-polarizing area P(n+1) is supposed to be 100%, the photoelectrically converted signal Sn+1 of the pixel Wn+1 is represented by the following Equation (1):

$$Sn+1 = T1(Ps(1) + Ps(2) + \ldots + Ps(n)) + Ps(n+1) \quad (1)$$

Next, the photoelectrically converted signal output by a pixel Wj (where j=1, 2, . . . or n), for which a polarization filter is provided, will be described. In this case, each polarization filter is supposed to have the same property as any polarizing area except in its transmission axis direction. Since a polarization filter is arranged to face the pixel Wj, basically the quantity of the light received by the pixel Wj should be obtained by multiplying the intensity of the incoming light by T1. Just like the pixel provided with no polarization filters, the pixel Wj also receives the incoming light by way of the light transmitting plate 2, the optical lens 3, and the infrared cut filter 4. In the meantime, the incoming light has its intensity decreased when passing through the polarizing area of the light transmitting plate 2. That is why the level of the photoelectrically converted signal Sj of the pixel Wj is represented by the following Equation (2):

$$Sj=T1/T2\{Ps(1)\cos(\alpha 1-\beta j)+Ps(2)\cos(\alpha 2-\beta j)+\ldots+Ps(n)\cos(\alpha n-\beta j)\}+Ps(n+1)] \quad (2)$$

where the optical transmittance in a situation where two polarizers that have the same transmission axis direction are stacked one upon the other is identified by T1×T2.

In this case, the relation between the pixel signal Sj and a signal Ps(j) representing the intensity of the light ray that has been transmitted through the area P(j) so as to be photoelectrically converted is expressed as a matrix by the following Equation (3):

$$\begin{pmatrix} T2\cos(\alpha 1-\beta 1) & T2\cos(\alpha 2-\beta 1) & \ldots & 1 \\ T2\cos(\alpha 1-\beta 2) & T2\cos(\alpha 2-\beta 2) & \ldots & 1 \\ \vdots & \vdots & \ldots & 1 \\ T1 & T1 & \ldots & 1 \end{pmatrix} \begin{pmatrix} Ps(1) \\ Ps(2) \\ \vdots \\ Ps(n+1) \end{pmatrix} = \begin{pmatrix} S'_1 \\ S'_2 \\ \vdots \\ S'_{n+1} \end{pmatrix} \quad (3)$$

where Sj'=Sj/T1.

As can be seen from this Equation (3), if the inverse matrix of the (n+1)×(n+1) matrix in Equation (3) is obtained and if both sides of this Equation (3) are multiplied by that inverse matrix from left to right, then image signals Ps(1), Ps(2), . . . and Ps(n+1) generated based on the light rays that have entered the respective areas P(1), P(2), . . . and P(n+1) of the light transmitting plate 2 can be calculated. The image signal generating section 7 shown in FIG. 1 performs this matrix operation on a pixel block basis, thereby calculating Ps(1), Ps(2), . . . and Ps (n+1) for one pixel block after another. A set of the signals thus generated represents multiple images that have been generated based on the light rays that have entered the polarizing areas P(1), P(2), . . . and P(n) and the non-polarizing area P(n+1).

In this preferred embodiment, the angle αi (where 1, 2, . . . n) defined by the transmission axis of each polarizing area and the angle βj (where j=1, 2, . . . n) defined by the transmission axis of each polarization filter are set so that the determinant value of the (n+1)×(n+1) matrix does not become equal to zero but is maximized. Since the determinant does not become equal to zero, Ps(1), Ps(2), . . . and Ps(n+1) can be calculated by Equation (3). In addition, since the value of the determinant can be maximized, computation errors can be minimized. As a result, the image signal generating section 7 can generate an image of better quality based on the light that has entered each area P(i) of the light transmitting plate 2. Among those images, if the images generated based on the light rays that have passed through two polarizing areas (e.g., P(1) and P(3) shown in FIG. 3) of the light transmitting plate 2, which are most distant from each other horizontally (i.e., in the x direction), are supposed to be a right-eye image and a left-eye image, respectively, then two images that have significant parallax in the x direction can be obtained. In addition, another image can also be obtained based on the light ray that has entered the non-polarizing area P(n+1). That is why if that non-polarizing area is set to be larger than any polarizing area, an image that would cause no sensitivity problem (i.e., that has been generated by using the incoming light efficiently enough) can be obtained. According to this preferred embodiment, the image sensor 1 cannot generate a color image. However, if a color representation pixel is added to the basic pixel arrangement shown in FIG. 4, a color image that is free from the sensitivity problem can also be obtained. For example, by further arranging color filters that face some of the pixels W1, W2, . . . and Wn+1 shown in FIG. 4, color information can be obtained, and therefore, a color image can be generated.

On top of that, by partially adding the image signal generated based on the light ray that has entered the non-polarizing area P(n+1) to the image signal generated based on the light ray that has entered a polarizing area P(i), the image generated based on the light ray that has entered the polarizing area P(i) can have an increased SNR. This processing may be carried out in the following procedure, for example. First of all, the degree of partial matching between the image based on the light that has entered each area P(i) of the light transmitting plate 2 and the image based on the light that has entered the non-polarizing area P(n+1) thereof is determined at one pair of corresponding points on those images after another. Next, if those images have turned out to be partially the same, that part of the image based on the light that has entered the non-polarizing area P(n+1) is added to its corresponding part of the image based on the light that has entered the area P(i). By performing such processing, the quality of those images that have parallax between them can be further improved.

As described above, in the image capture device of this preferred embodiment, pixels of the image sensor 1 are arranged in (n+1) rows and one column as a fundamental unit, which includes n pixels W1, W2, . . . and Wn, for which n polarization filters with respectively different transmission axis directions are provided, and a pixel Wn+1, for which no polarization filters are provided at all. In addition, the image capture device 1 further includes a light transmitting plate 2 that consists of the n polarizing areas P(1), P(2), . . . and P(n) with mutually different transmission axis directions and the non-polarizing area P(n+1) as the rest of the plate. With such an arrangement, an equation showing the relation between image signals generated based on the light rays that have entered (n+1) areas of the light transmitting plate 2 and pixel signals that are supplied from the respective pixels is derived. And an image signal generated based on the light ray that has entered each area of the light transmitting plate 2 can be calculated by that equation. As a result, multi-viewpoint images can be generated and an image that has entered the non-polarizing area and that is free from a sensitivity problem can also be obtained. Furthermore, by performing the processing of determining the degree of partial matching between the image based on the light that has entered each area P(i) of the light transmitting plate 2 and the image based on the light that has entered the non-polarizing area P(n+1) and the processing of adding those images together, the quality of the multi-viewpoint images can also be improved.

In the preferred embodiment described above, pixels are supposed to be arranged basically in (n+1) rows and one column on the imaging area of the solid-state image sensor 1. However, that arrangement does not always have to be used. Rather, any other arrangement may also be adopted as long as n pixels that are arranged to face n polarization filters and one pixel provided with no polarization filter together form one block of neighboring pixels. Also, in the preferred embodiment described above, a light transmitting plate 2, in which n polarizing areas are arranged discretely, is supposed to be used. However, the light transmitting member of the present invention does not have to be such a light transmitting plate 2. For example, there is no problem at all even if a number of polarizing areas are defined either on the surface of a lens or inside the light transmitting part of a diaphragm. In sort, the same effect can be achieved as long as a number of polarizing areas are provided in one way or another inside of the optical system for the incident light.

Embodiment 2

Next, a second preferred embodiment of the present invention will be described. The image capture device of this second preferred embodiment is different from its counterpart of the first preferred embodiment only in the structure of the light transmitting plate 2, the pixel arrangement of the image sensor 1 and the signal arithmetic processing performed by the image generating section 7. Thus, the following description of the second preferred embodiment will be focused on only those differences and their common features will not be described all over again to avoid redundancies.

Figure 5:
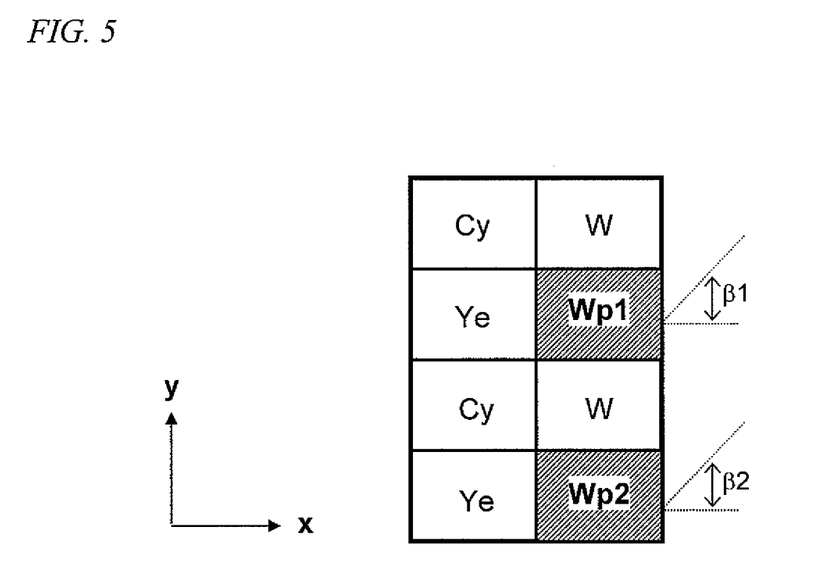
FIG. 5 illustrates a basic color scheme on the image capturing section of a solid-state image sensor according to a second preferred embodiment of the present invention.

FIG. 5 illustrates a basic color scheme on the imaging area of the solid-state image sensor 1 of this preferred embodiment. In this preferred embodiment, each of multiple pixel blocks that form the pixel array of the image sensor 1 of this preferred embodiment is comprised of eight pixels that are arranged in four rows and two columns. Specifically, cyan filters (cyan elements Cy) that transmit a light ray falling within the cyan wavelength range (that covers the green and blue wavelength ranges) are arranged at a row 1, column 1 position and at a row 3, column 1 position to face their associated pixels. Transparent members (transmit elements W) are arranged at a row 1, column 2 position and at a row 3, column 2 position to face their associated pixels. Yellow filters (yellow elements Ye) that transmit a light ray falling within the yellow wavelength range (that covers the red and green wavelength ranges) are arranged at a row 2, column 1 position and at a row 4, column 1 position so as to face their associated pixels. A polarizing filter (polarizing element Wp1), of which the transmission axis defines an angle β1 with respect to the x direction, is arranged at a row 2, column 2 position so as to face its associated pixel. And another polarizing filter (polarizing element Wp2), of which the transmission axis defines an angle β2 with respect to the x direction, is arranged at a row 4, column 2 position so as to face its associated pixel. In the following description, the cyan, yellow, transparent and polarizing elements will sometimes be collectively referred to herein as "color elements".

Figure 6:
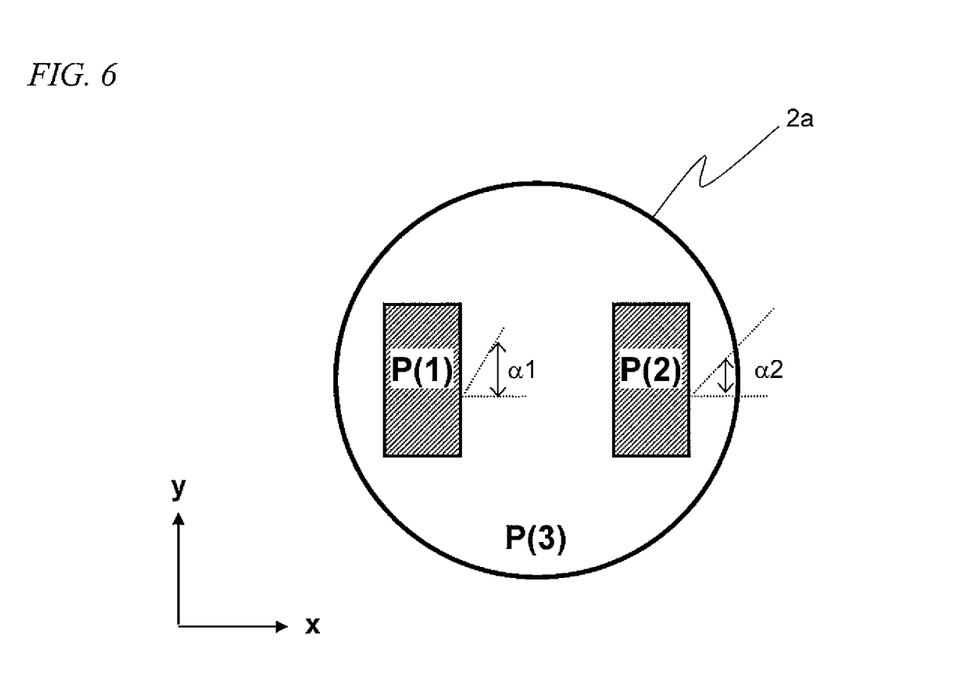
FIG. 6 is a front view of the light transmitting plate of the second preferred embodiment of the present invention.

FIG. 6 is a front view illustrating the light transmitting plate 2a of this preferred embodiment. This light transmitting plate 2a has a circular shape and has the same effective aperture as the optical lens 3. The light transmitting plate 2a has a rectangular polarizing area P(1) that transmits only a light ray that is polarized in a direction that defines an angle α1 with respect to the x direction on the left hand side of FIG. 6 and another polarizing area P(2) of the same size that transmits only a light ray that is polarized in a direction that defines an angle α2 with respect to x direction on the right hand side of FIG. 6. The rest of the light transmitting plate 2a other than these polarizing areas P(1) and P(2) is a non-polarizing area P(3) that transmits incoming light irrespective of its polarization direction. The two polarizing areas P(1) and P(2) of the light transmitting plate 2a are arranged on mutually opposite sides with respect to a line segment that passes the center of the light transmitting plate 2a and that evenly splits the photosensitive plane into two. Also, a part of the non-polarizing area P(3) is located between the two polarizing areas P(1) and P(2). With such an arrangement, multi-viewpoint images can be generated based on the light rays entering these two polarizing areas P(1) and P(2) and an image can also be obtained with the incoming light used highly efficiently.

Hereinafter, it will be described how to generate such multi-viewpoint images according to this preferred embodiment. Signals representing the intensities of the light rays that have been transmitted through the Wp1, Wp2 and W elements and then photoelectrically converted by the pixels that face those elements will be identified herein by S1, S2 and S3, respectively. In this case, the polarizing areas P(1) and P(2) of the light transmitting plate 2a and the Wp1 and Wp2 elements of the image sensor 1 are supposed to have the same polarization property except their polarization directions. Specifically, supposing the polarizing area P(1) of the light transmitting plate 2a has an optical transmittance of 100%, the level of a signal representing the intensity of the light ray that has been transmitted through that area, the optical lens 3, and the infrared cut filter 4 and then photoelectrically converted will be identified herein by Ps(1). In the same way, supposing the polarizing area P(2) of the light transmitting plate 2a has an optical transmittance of 100%, the level of a signal representing the intensity of the light ray that has been transmitted through that area, the optical lens 3, and the infrared cut filter 4 and then photoelectrically converted will be identified herein by Ps(2). On the other hand, the level of a signal representing the intensity of the light ray that has been transmitted through the non-polarizing area (transparent area) P(3) of the light transmitting plate 2a, the optical lens 3, and the infrared cut filter 4 and then photoelectrically converted will be identified herein by Ps(3). Since the polarizing areas P(1) and P(2) of the light transmitting plate 2a do not actually have a transmittance of 100%, the actual transmittance of those areas will be identified herein by T1. Also, the optical transmittance to be obtained when two polarizers with the same transmission axis direction are stacked one upon the other will be identified herein by T1×T2. The non-polarizing area P(3) of the light transmitting plate 2a is supposed to have an optical transmittance of 100%.

Furthermore, the level S3 of a signal representing the intensity of the light ray that has been transmitted through the W element and then photoelectrically converted by the pixel that faces the W element can be expressed by the following Equation (4) using Ps(1), Ps(2) and Ps(3). Also, the level of a signal representing the intensity of the light ray that has been transmitted through the polarizing area P(1) or P(2) of the light transmitting plate 2a, the optical lens 3, and the infrared cut filter 4 and then photoelectrically converted can be calculated by T1×(Ps(1)+Ps(2)). Since the level of a signal representing the intensity of the light ray that has been transmitted through the non-polarizing area P(3) of the light transmitting plate 2a, the optical lens 3, and the infrared cut filter 4 and then photoelectrically converted is Ps(3), the signal level S3 is given by the following Equation (4):

$$S3 = T1(Ps(1) + Ps(2)) + Ps(3) \quad (4)$$

The level S1 of a signal representing the intensity of the light ray that has been transmitted through the Wp1 element and then photoelectrically converted by the pixel that faces the Wp1 element can also be expressed in the following manner using Ps(1), Ps(2) and Ps(3). The level of a signal representing the intensity of the light ray that has been transmitted through the polarizing area P(1) of the light transmitting plate 2a, the optical lens 3, and the infrared cut filter 4 and then photoelectrically converted can be calculated by T1×T2×Ps(1)cos(α1−β1). On the other hand, the level of a signal representing the intensity of the light ray that has been transmitted through the polarizing area P(2) of the light transmitting plate 2a, the optical lens 3, and the infrared cut filter 4 and then photoelectrically converted can be calculated by T1×T2×Ps(2)cos(α2−β1). Furthermore, the level of a signal representing the intensity of the light ray that has been transmitted through the non-polarizing area P(3) of the light transmitting plate 2a, the optical lens 3, and the infrared cut filter 4 and then photoelectrically converted is obtained by T1×Ps (3). Consequently, the signal level S1 is given by the following Equation (5):

$$S1 = T1/T2\{Ps(1)\cos(\alpha 1-\beta 1) + Ps(2)\cos(\alpha 2-\beta 1)\} + Ps(3)] \quad (5)$$

The level S2 of a signal representing the intensity of the light ray that has been transmitted through the Wp2 element and then photoelectrically converted by the pixel that faces the Wp2 element can also be expressed in the following manner using Ps(1), Ps(2) and Ps(3). First, the level of a signal representing the intensity of the light ray that has been transmitted through the polarizing area P(1) of the light transmitting plate 2a, the optical lens 3, and the infrared cut filter 4 and then photoelectrically converted can be calculated by T1×T2×Ps(1)cos(α1−β2). On the other hand, the level of a signal representing the intensity of the light ray that has been transmitted through the polarizing area P(2) of the light transmitting plate 2a, the optical lens 3, and the infrared cut filter 4 and then photoelectrically converted can be calculated by T1×T2×Ps(2)cos(α2−β2). Furthermore, the level of a signal representing the intensity of the light ray that has been transmitted through the non-polarizing area P(3) of the light transmitting plate 2a, the optical lens 3, and the infrared cut filter 4 and then photoelectrically converted is obtained by T1×Ps (3). Consequently, the signal level S2 is given by the following Equation (6):

$$S2 = T1/T2\{Ps(1)\cos(\alpha 1-\beta 2) + Ps(2)\cos(\alpha 2-\beta 2)\} + Ps(3)] \quad (6)$$

In this case, supposing S1'=S1/T1 and S2'=S2/T1, these Equations (4), (5) and (6) can be represented as a matrix by the following Equation (7):

$$\begin{pmatrix} T2\cos(\alpha 1-\beta 1) & T2\cos(\alpha 2-\beta 1) & 1 \\ T2\cos(\alpha 1-\beta 2) & T2\cos(\alpha 2-\beta 2) & 1 \\ T1 & T1 & 1 \end{pmatrix} \begin{pmatrix} Ps(1) \\ Ps(2) \\ Ps(3) \end{pmatrix} = \begin{pmatrix} S'_1 \\ S'_2 \\ S'_3 \end{pmatrix} \quad (7)$$

The image generating section 7 shown in FIG. 1 obtains the inverse matrix of the 3×3 matrix in Equation (7), thereby calculating three images based on the light rays that have been transmitted through the respective areas P(1), P(2) and P(3) of the light transmitting plate 2a. To obtain the inverse matrix, however, the determinant should have a non-zero value. Also, the greater the determinant value, the smaller the computation error should be.

According to this preferred embodiment, the angles α1, α2, β1 and β2 indicating the polarization directions were determined by simulations so as to maximize that determinant value. The simulations were carried out with T1, T2 and α1 set to be 0.45, 0.90 and 0, respectively, and with α2, β1 and β2 changed from 0 through 90 degrees on a one-degree-a-time basis. The results of those simulations revealed that the determinant value became maximum when α1, α2, β1 and β2 were 0, 60, 0 and 60 degrees, respectively. Thus, those values were adopted. As a result, images could be obtained based on the light rays that had been transmitted through the areas P(1) and P(2) and multi-viewpoint images could be generated.

On the other hand, a color image can be generated in the following manner based on the level Scy of a signal representing the intensity of the light ray that has been transmitted through the cyan elements and then photoelectrically converted, the level Sye of a signal representing the intensity of the light ray that has been transmitted through the yellow elements and then photoelectrically converted, and the level S3 of a signal representing the intensity of the light ray that has been transmitted through the W elements and then photoelectrically converted. Specifically, information Sr about the color red can be obtained by calculating (S3−Scy). Information Sb about the color blue can be obtained by calculating (S3−Sye). And information about the color green can be obtained by calculating (S3−Sr−Sb). By performing these computations, an RGB color image can be generated easily. As a result, according to this preferred embodiment, just the light that has been lost at the polarizing area of the light transmitting plate 2a is the quantity of the light that cannot be used efficiently. Consequently, supposing the decrease in the quantity of light at each polarizing area is 50%, a color image that can use 75% of the incoming light by adding the quantity of the light ray transmitted through the non-polarizing area can be obtained.

As described above, in the image capture device of this preferred embodiment, pixels are arranged in four rows and two columns as a fundamental unit, and two cyan elements, two yellow elements, two transparent elements and two, polarizing elements are arranged to face those eight pixels. Specifically, cyan elements (Cy) are arranged at a row 1, column 1 position and at a row 3, column 1 position. Transparent elements (W) are arranged at a row 1, column 2 position and at a row 3, column 2 position. Yellow elements (Ye) are arranged at a row 2, column 1 position and at a row 4, column 1 position. A polarizing element (Wp1), of which the transmission axis defines an angle β1 with respect to the x direction, is arranged at a row 2, column 2 position. And another polarizing element (Wp2), of which the transmission axis defines an angle β2 with respect to the x direction, is arranged at a row 4, column 2 position. The light transmitting plate 2a has a polarizing area P(1), of which the transmission axis direction defines an angle α1 with respect to the x direction, on the left hand side of FIG. 6 and a polarizing area P(2), which has the same size as the polarizing area P(1) and of which the transmission axis direction defines an angle α2 with respect to the x direction, on the right hand side of FIG. 6. By making computations on the signals supplied from the pixels that face the transparent elements W and the signals supplied from the pixels that face the polarizing elements Wp1 and Wp2, multi-viewpoint images can be generated. Also, by making computations on the pixel signals supplied from the pixels that face the cyan elements Cy, the yellow elements Y and the transparent elements W, respectively, a color image can be generated with the sensitivity much less decreased. That is to say, not only multi-viewpoint images but also a color image that would cause a much less decrease in sensitivity can be obtained at the same time just by making simple computations between those image signals without using any mechanical driving section unlike the prior art.

In the preferred embodiment described above, the polarizing areas P(1) and P(2) of the light transmitting plate 2a are supposed to have a rectangular shape. However, this is only an example. Also, the transmission axes of the polarizing elements Wp1 and Wp2 and the polarizing areas P(1) and P(2) are supposed to define 0, 60, 0 and 60 degrees, respectively, with respect to the horizontal (x) direction in the preferred embodiment described above but may also define respectively different angles as long as Ps(1) through Ps(3) can be obtained by Equation (7). Furthermore, although cyan, yellow, transparent and polarizing elements are used in the preferred embodiment described above, it is not always necessary to adopt such a color scheme because a color image can be generated as long as three kinds of color elements with different transmitting wavelength ranges are used. For example, the cyan and yellow elements may be replaced with a blue filter (blue element B) that transmits light falling within the blue wavelength range and a red filter (red element R) that transmits light falling within the red wavelength range. Optionally, a color filter may also be arranged to face a pixel for which the polarizing element Wp1 or Wp2 is already provided. For example, a green filter (green element G) that transmits light falling within the green wavelength range may be arranged on the optical path of the light to be transmitted through the polarizing element Wp1, Wp2 and the transparent element W may be replaced with another green element G. Anyway, if four kinds of color elements are arranged, the two elements in the same color are preferably either transparent elements or green elements representing the color green that is relatively easily conforms to the human luminosity property.

This preferred embodiment may be modified in the following manner, for example. (1) The two elements of at least one row of the arrangement shown in FIG. 5 may be changed with each other. (2) The Cy elements shown in FIG. 5 may be replaced with elements in one of the two colors red and blue and the Ye elements may be replaced with elements in the other color. (3) The two elements of at least one row of the arrangement (2) may be changed with each other. (4) The Cy filters shown in FIG. 5 may be replaced with elements in one of the two colors red and blue, the Ye elements may be replaced with elements in the other color, the W elements may be replaced with green elements, and green elements may be added to the Wp1 and Wp2 elements. And (5) the two elements of at least one row of the arrangement (4) may be changed with each other. In any of these modified examples, multi-viewpoint images and a color image that uses the incoming light highly efficiently can also be generated by performing similar signal arithmetic operations.

Although the number of polarizing areas to provide for the light transmitting plate 2a is supposed to be two in the preferred embodiment described above, three or more polarizing areas may also be provided with no problem at all. If three polarizing areas are provided, for example, one of the two transparent elements W of the image sensor 1 may be replaced with a polarizing element Wp3. In that case, the 3×3 matrix in Equation (7) will be a 4×4 matrix. The polarization directions that maximize its determinant will be 0, 45 and 90 degrees on both of the light transmitting plate 2a and the image sensor 1 alike. In this manner, if the number of polarizing areas is increased with their polarization directions selected appropriately, multiple sets of images that have mutually different parallaxes can be obtained.

Embodiment 3

Figure 7:
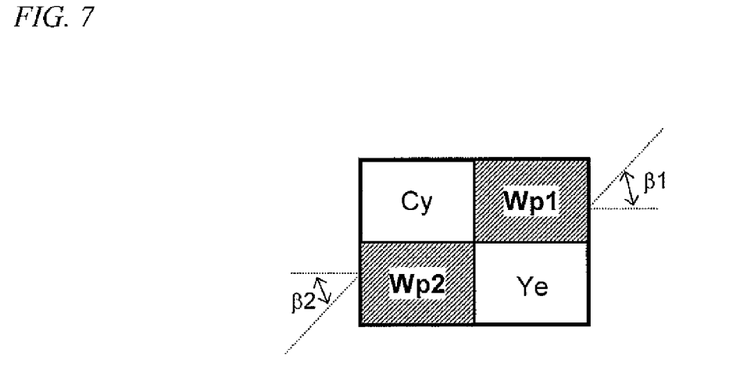
FIG. 7 illustrates a basic color scheme on the imaging area of a solid-state image sensor according to a third preferred embodiment of the present invention.

Hereinafter, a third preferred embodiment of the present invention will be described. FIG. 7 illustrates a basic color scheme on the imaging area of the solid-state image sensor 1 of this preferred embodiment. These elements are arranged in two rows and two columns to form a 2×2 matrix as a fundamental unit. In this matrix, a cyan element (Cy) is arranged at a row 1, column 1 position, a polarizing element (Wp1), of which the transmission axis defines an angle $\beta 1$ with respect to the x direction, is arranged at a row 1, column 2 position, a yellow element (Ye) is arranged at a row 2, column 1 position, and a polarizing element (Wp2), of which the transmission axis defines the angle $\beta 2$ with respect to the x direction, is arranged at a row 2, column 2 position. Each pixel of the solid-state image sensor 1 is associated with, and faces, one of these color elements. The light transmitting plate 2a used in this preferred embodiment is the same as that of the second preferred embodiment described above. Thus, the following description of the third preferred embodiment will be focused on only differences from the second preferred embodiment described above and their common features will not be described all over again to avoid redundancies.

Since the arrangement of this preferred embodiment includes no W elements, the computations that are adopted in the second preferred embodiment are not applicable as they are. If a subject in almost an achromatic color is going to be captured, however, Cy+Ye=W+G. That is why if the photodetector signal ratios of RGB are represented by Kr, Kg and Kb, respectively, a signal that should be generated through the W element could be obtained by multiplying the sum of the signals obtained through the Cy and Ye elements by (Kr+Kg+Kb)/(Kr+2Kg+Kb). Thus, if the result obtained by making such a computation is used as a signal representing the intensity of the light ray that has been photoelectrically converted by the pixel that faces the W element, then multi-viewpoint images can also be generated by performing the same processing as in the second preferred embodiment described above.

On the other hand, a color image can be generated in the following manner based on the level Scy of a signal representing the intensity of the light ray that has been transmitted through the cyan element and then photoelectrically converted, the level Sye of a signal representing the intensity of the light ray that has been transmitted through the yellow element and then photoelectrically converted, the level S1 of a signal representing the intensity of the light ray that has been transmitted through the Wp1 element and then photoelectrically converted, and the level S2 of a signal representing the intensity of the light ray that has been transmitted through the Wp2 element and then photoelectrically converted. First of all, S1 and S2 are added together and the sum is supposed to represent the signal level S3 of the W element. Then, information Sr about the color red can be obtained by calculating (S3−Scy). Information Sb about the color blue can be obtained by calculating (S3−Sye). And information about the color green can be obtained by calculating (S3−Sr−Sb). As a result, according to this preferred embodiment, just the light that has been lost at the polarizing area P(1) or P(2) of the light transmitting plate 2a is the quantity of the light that cannot be used efficiently. Consequently, by adding the quantity of the light transmitted through the non-polarizing area P(3), a color image can be generated with a significantly smaller percentage of the incoming light wasted.

As described above, in the image capture device of this preferred embodiment, pixels are arranged in two rows and two columns so as to form a 2×2 matrix as a fundamental unit, and a Cy element, a Ye element, and two polarizing elements are arranged to face those four pixels. Specifically, a cyan element (Cy) is arranged at a row 1, column 1 position, a polarizing element (Wp1), of which the transmission axis defines an angle $\beta 1$ with respect to the x direction, is arranged at a row 1, column 2 position, a yellow element (Ye) is arranged at a row 2, column 1 position, and a polarizing element (Wp2), of which the transmission axis defines the angle $\beta 2$ with respect to the x direction, is arranged at a row 2, column 2 position. The light transmitting plate 2a has a polarizing area P(1), of which the transmission axis direction defines an angle α1 with respect to the x direction, on the left hand side of FIG. 6 and a polarizing area P(2), which has the same size as the polarizing area P(1) and of which the transmission axis direction defines an angle α2 with respect to the x direction, on the right hand side of FIG. 6. By making computations on the signals supplied from the pixels that face the cyan element Cy, the yellow element Ye and the two polarizing elements Wp1 and Wp2, multi-viewpoint images and a color image that would cause a much less decrease in sensitivity can be generated. That is to say, as in the first and second preferred embodiments described above, not only multi-viewpoint images but also a color image that would cause a much less decrease in sensitivity can be obtained at the same time just by making simple computations between those image signals without using any mechanical driving section unlike the prior art.

Although the color scheme shown in FIG. 7 is adopted in the preferred embodiment described above, the positions of the cyan, yellow and polarizing elements may be changed. Also, the cyan and yellow elements may be replaced with red and blue elements. Furthermore, as in the second preferred embodiment described above, either a green element or a transparent element may be arranged on the optical path of the light that is going to enter the polarizing element Wp1, Wp2.

In the first, second and third preferred embodiments of the present invention, the image capture device is designed to obtain both multi-viewpoint images and a color image alike. However, the image capture device may also be designed to obtain only multi-viewpoint images. If the present invention is used to get only parallax information, the Cy and Ye elements shown in FIGS. 5 and 7 may be omitted.

Optionally, the image capture device may also obtain the multi-viewpoint images and then subject them to differential processing to get a differential image. Furthermore, the image capture device may also obtain a so-called "disparity map", which is a parallax image representing the magnitude of shift in position between each pair of associated points on the images, based on the multi-viewpoint images. By getting such a differential image or disparity map, information indicating the depth of the subject can be obtained.

In the first through third preferred embodiments of the present invention described above, a signal arithmetic operation is performed on a photoelectrically converted signal that has been obtained by capturing, thereby generating an image. However, such processing of generating an image through the signal arithmetic operations may be carried out by another device independently of the image capture device. In that case, the image capture device does not have to include the image signal generating section 7 shown in FIG. 1. Then, the same effect can also be achieved by loading a signal that has been obtained by an image capture device with the image capturing section 100 of the first through third preferred embodiments described above into another device and by getting a program defining the signal arithmetic processing of the preferred embodiments described above executed by that another device.

INDUSTRIAL APPLICABILITY

The 3D image capture device of the present invention can be used effectively in every camera that uses a solid-state image sensor, and may be used in digital still cameras, digital camcorders and other consumer electronic cameras and in industrial solid-state surveillance cameras, to name just a few.

REFERENCE SIGNS LIST 1 solid-state image sensor
1a imaging area
2 light transmitting plate
3 optical lens
4 infrared cut filter
5 signal generating and image signal receiving section
6 sensor driving section
7 image signal generating section
8 image interface section
9 image capture device
10 pixel
11 0-degree-polarization polarizer
12 90-degree-polarization polarizer
13 reflective mirror
14 half mirror
15 circular polarization filter
16 driver that rotates the polarization filter
17, 18 polarization filter
19 light transmitting member
20, 21 polarized light transmitting portion
22 light receiving member optical filter tray
23 particular component transmitting filter
24 color filter
25 filter driving section
30 memory
100 image capturing section
110 filter array
200 signal processing section

The invention claimed is:

1. A 3D image capture device comprising:
a light transmitting member with n polarizing areas where n is an integer that is equal to or greater than two, each of which transmits only a light ray that is polarized in a particular direction, and a non-polarizing area that transmits any light ray irrespective of its polarization direction, the n polarizing areas having mutually different transmission axis directions parallel to a polarization direction of the light that is transmitted through each respective polarizing area;
a solid-state image sensor which is arranged to receive the light ray that has been transmitted through the light transmitting member and which includes a pixel array and a filter array, the pixel array being divided into a plurality of pixel blocks, each of which includes n+1 pixels, the filter array being divided into a plurality of filter blocks, each of which includes n polarization filters that are arranged so as to face n out of the n+1 pixels and that have mutually different transmission axis directions parallel to a polarization direction of the light that is transmitted through each respective polarization filter, each of the n polarization filters configured to make at least part of light rays that have been transmitted through the n polarizing areas and at least part of light rays that have been transmitted through the non-polarizing area incident on one of the n+1 pixels that faces the polarization filter at the same time;
an imaging section for producing an image on the imaging area of the solid-state image sensor; and
an image generating section configured to calculate n+1 images associated with the light rays that have entered the n polarizing areas and on the non-polarizing area using n+1 pixel signals supplied from the n+1 pixels.

2. The 3D image capture device of claim 1, wherein the image generating section generates the n+1 images by performing computations using a matrix of n+1 rows and n+1 columns, the matrix being defined by the respective optical transmittances of the polarizing areas, the polarization filters and the non-polarizing area.

3. The 3D image capture device of claim 2, wherein the image generating section forms the matrix by defining the transmittance of a light ray that has been transmitted through a $j^{th}$ polarizing area where j is an integer that satisfies $1 \leq j \leq n$ and then an $i^{th}$ polarization filter where i is an integer that satisfies $1 \leq i \leq n$ to be an element a i, j at a row i, column j position, the transmittance of a light ray that has been transmitted through the non-polarizing area and then the $i^{th}$ polarization filter to be an element a i, n+1 at a row i, column n+1 position, and the transmittance of a light ray that has been transmitted through any of the first through $n^{th}$ polarizing areas to be an element a n+1, j at a row n+1, column j position, respectively, and wherein the image generating section makes computations using the inverse matrix of the matrix and the n+1 pixel signals, thereby generating the n+1 images.

4. The 3D image capture device of claim 2, wherein the respective transmission axis directions of the polarizing areas and the polarization filters are set so as to prevent the determinant of the matrix from going zero.

5. The 3D image capture device of claim 2, wherein the respective transmission axis directions of the polarizing areas and the polarization filters are set so as to maximize the absolute value of the determinant of the matrix.

6. The 3D image capture device of claim 1, wherein n=2.

7. The 3D image capture device of claim 6, wherein if one of the n polarizing areas is called a first polarizing area and the other a second polarizing area, the first and second polarizing areas are arranged on mutually opposite sides with respect to a line segment that passes the center of the light transmitting member and that evenly splits the light-receiving area of the light transmitting member into two.

8. The 3D image capture device of claim 6, wherein at least a part of the non-polarizing area is located between the first and second polarizing areas.

9. The 3D image capture device of claim 1, wherein if n=2 and if one of the n polarization filters is called a first polarization filter and the other a second polarization filter, each said pixel block is comprised of eight pixels, which include the n pixels and which are arranged in four rows and two columns, and a first color filter for transmitting a light ray falling within a first wavelength range is arranged so as to face a pixel at a row 1, column 1 position and a pixel at a row 3, column 1 position, and a second color filter for transmitting a light ray falling within a second wavelength range is arranged so as to face a pixel at row 2, column 1 position and a pixel at a row 4, column 1 position, and either a third color filter for transmitting a light ray falling within a third wavelength range or a transparent member is arranged so as to face a pixel at a row 1, column 2 position and a pixel at a row 3, column 2 position, and the first polarization filter is arranged so as to face a pixel at a row 2, column 2 position, and the second polarization filter is arranged so as to face a pixel at a row 4, column 2 position.

10. The 3D image capture device of claim 1, wherein n=2, and wherein each said pixel block is comprised of four pixels including the n pixels, and wherein if the four pixels are called first, second, third and fourth pixels, respectively, and if one of the n polarization filters is called a first polarization filter and the other a second polarization filter, a first color filter for transmitting a light ray falling within a first wavelength range is arranged so as to face the first pixel, and a second color filter for transmitting a light ray falling within a second wavelength range is arranged so as to face the second pixel, and the first polarization filter and a third color filter for transmitting a light ray falling within a third wavelength range are arranged so as to face the third pixel, and the second polarization filter and the third color filter for transmitting the light ray falling within the third wavelength range are arranged so as to face the fourth pixel.

11. The 3D image capture device of claim 1, wherein the image generating section adds an image signal associated with a light ray that has entered the non-polarizing area to an image signal associated with a light ray that has entered each said polarizing area, thereby increasing an SN ratio of an image that has been generated based on the light ray that has entered each said polarizing area.

* * * * *